United States Patent
Assulin et al.

(10) Patent No.: US 11,599,340 B2
(45) Date of Patent: Mar. 7, 2023

(54) LOAD TESTING

(71) Applicant: HEWLETT PACKARD ENTERPRISE DEVELOPMENT LP, Houston, TX (US)

(72) Inventors: Ohad Assulin, Yehud (IL); Ilan Shufer, Yehud (IL); Amit Levin, Yehud (IL)

(73) Assignee: MICRO FOCUS LLC, Sanford, NC (US)

( * ) Notice: Subject to any disclaimer, the term of this patent is extended or adjusted under 35 U.S.C. 154(b) by 1131 days.

(21) Appl. No.: 15/504,011

(22) PCT Filed: Dec. 23, 2014

(86) PCT No.: PCT/US2014/072061
§ 371 (c)(1),
(2) Date: Feb. 14, 2017

(87) PCT Pub. No.: WO2016/105366
PCT Pub. Date: Jun. 30, 2016

(65) Prior Publication Data
US 2017/0277523 A1    Sep. 28, 2017

(51) Int. Cl.
G06F 11/34    (2006.01)
G06F 8/41     (2018.01)
(Continued)

(52) U.S. Cl.
CPC ............ *G06F 8/433* (2013.01); *G06F 8/75* (2013.01); *G06F 11/3414* (2013.01);
(Continued)

(58) Field of Classification Search
USPC .......................................................... 717/124
See application file for complete search history.

(56) References Cited

U.S. PATENT DOCUMENTS 6,145,121 A * 11/2000 Levy .................. G06F 11/3461
703/22
6,507,947 B1    1/2003 Schrieber et al.
(Continued)

FOREIGN PATENT DOCUMENTS

JP    2006031178 A    2/2006
JP    2006155047 A    6/2006

OTHER PUBLICATIONS

Ricca et al., "Construction of the System Dependence Graph for Web Application Slicing", 2002, Proceeding of the Second IEEE International Workshop on Source Code Analysis and Manipulation (Year: 2002).*

(Continued)

*Primary Examiner* — Jason D Mitchell

(57) ABSTRACT

Examples relate to load testing. The examples disclosed herein enable obtaining lines of code that are recorded as an application is executed in a client computing device, the lines of code being recorded in chronological order of the execution; determining whether a dependency on at least one variable exists in individual lines of the lines of code; in response to determining that the dependency exists, storing the dependency in a data storage; identifying, from the lines of code, a line of code including a network call statement that calls a called variable; and eliminating a first subset of the lines of code based on the called variable and dependencies stored in the data storage, wherein a second subset of the lines of code that remain after the elimination comprises user-entered parameter data.

20 Claims, 7 Drawing Sheets

(51) Int. Cl.
  *G06F 11/36* (2006.01)
  *G06F 8/75* (2018.01)
(52) U.S. Cl.
  CPC ...... *G06F 11/3461* (2013.01); *G06F 11/3466* (2013.01); *G06F 11/3668* (2013.01)

(56) References Cited

U.S. PATENT DOCUMENTS

| | | | |
|---|---|---|---|
| 6,654,952 B1 | 11/2003 | Nair | |
| 7,051,322 B2 | 5/2006 | Rioux | |
| 7,290,048 B1 * | 10/2007 | Barnett | G06F 11/3495 709/223 |
| 7,669,187 B2 * | 2/2010 | Liu | G06F 11/3644 712/227 |
| 8,479,171 B2 * | 7/2013 | Ghosh | G06F 11/3684 717/124 |
| 8,682,636 B2 * | 3/2014 | Bischof | G06F 9/45512 703/21 |
| 8,914,675 B2 * | 12/2014 | Hatano | G06F 11/263 714/32 |
| 8,949,797 B2 | 2/2015 | Aaraj et al. | |
| 9,430,240 B1 * | 8/2016 | Atta | G06F 9/3851 |
| 9,465,718 B2 | 10/2016 | Amichai | |
| 2004/0030747 A1 * | 2/2004 | Oppermann | G06F 11/3414 709/203 |
| 2004/0054990 A1 * | 3/2004 | Liao | G06F 8/4442 717/124 |
| 2004/0111727 A1 | 6/2004 | Schwarzbauer et al. | |
| 2005/0137844 A1 * | 6/2005 | Voruganti | G06F 11/3684 704/2 |
| 2005/0138104 A1 * | 6/2005 | Houh | G06F 11/3684 709/200 |
| 2005/0160322 A1 * | 7/2005 | West | G06F 11/3684 714/38.1 |
| 2005/0203902 A1 | 9/2005 | Davis et al. | |
| 2006/0095474 A1 * | 5/2006 | Mitra | G06Q 10/00 |
| 2006/0168467 A1 * | 7/2006 | Couturier | G06F 11/3414 714/4.2 |
| 2008/0028367 A1 * | 1/2008 | Cary | G06F 8/75 717/113 |
| 2008/0059625 A1 | 3/2008 | Barnett et al. | |
| 2008/0196012 A1 * | 8/2008 | Cohen | G06F 8/75 717/125 |
| 2009/0089039 A1 * | 4/2009 | Shufer | G06F 11/3664 703/23 |
| 2009/0089756 A1 * | 4/2009 | Danton | G06F 11/3644 717/124 |
| 2010/0115496 A1 | 5/2010 | Amichai | |
| 2010/0269102 A1 * | 10/2010 | Latorre | G06F 9/3842 717/130 |
| 2010/0306749 A1 | 12/2010 | Rioux | |
| 2011/0099541 A1 * | 4/2011 | Blomstedt | G06F 8/433 717/136 |
| 2011/0131551 A1 * | 6/2011 | Amichai | G06F 11/3668 717/125 |
| 2011/0258610 A1 | 10/2011 | Aaraj et al. | |
| 2011/0314337 A1 * | 12/2011 | Sinha | G06F 11/3624 714/37 |
| 2012/0124495 A1 * | 5/2012 | Amichai | G06F 8/34 715/762 |
| 2012/0151453 A1 * | 6/2012 | Finking | G06F 11/3624 717/130 |
| 2012/0311387 A1 | 12/2012 | Santhosh et al. | |
| 2013/0160128 A1 * | 6/2013 | Dolan-Gavitt | G06F 11/3414 726/25 |
| 2013/0219220 A1 | 8/2013 | Kraus et al. | |
| 2013/0290939 A1 | 10/2013 | Eliassaf et al. | |
| 2013/0326202 A1 * | 12/2013 | Rosenthal | G06F 11/3428 712/227 |
| 2014/0019941 A1 * | 1/2014 | Funke | G06F 3/048 717/124 |
| 2015/0186251 A1 * | 7/2015 | Friedler | G06F 11/3672 717/124 |
| 2016/0094572 A1 * | 3/2016 | Tyagi | H04L 63/1425 726/23 |
| 2018/0113686 A1 * | 4/2018 | Li | G06F 8/427 |
| 2018/0121315 A1 * | 5/2018 | Abadi | G06F 8/71 |
| 2018/0336020 A1 * | 11/2018 | Berg | G06F 16/9024 |

OTHER PUBLICATIONS

Kotaro Suzumura, "Part 2—Test tool utilization technique to automate testing—(3) Load test", Software TestPRESS, vol. 3, Gijutsu-Hyohron Co., Ltd., Aug. 25, 2006, The first edition, pp. 36-45.
International Search Report & Written Opinion received in PCT Application No. PCT/US2014/072061, dated Sep. 17, 2015, 10 pages.
Snellman, N. et al., "Towards Automatic Performance and Scalability Testing of Rich internet Applications in the Cloud," (Research Paper), May 27, 2011, 9 pages, available at https://www.cloudsoftwareproaram.org/rs/2131/9ed65124-0873-400e-bc8a-9c85c1f1afa8/fe0/filename/astoria.pdf.

* cited by examiner

LOAD TESTING

BACKGROUND

Load testing is the practice of verifying integrity and performance of an application while simulating load conditions such as traffic. To perform load testing of an application such as a web application, a testing script may be generated for simulating traffic behavior associated with execution of the application.

BRIEF DESCRIPTION OF THE DRAWINGS

The following detailed description references the drawings, wherein.

DETAILED DESCRIPTION

Figure 1:
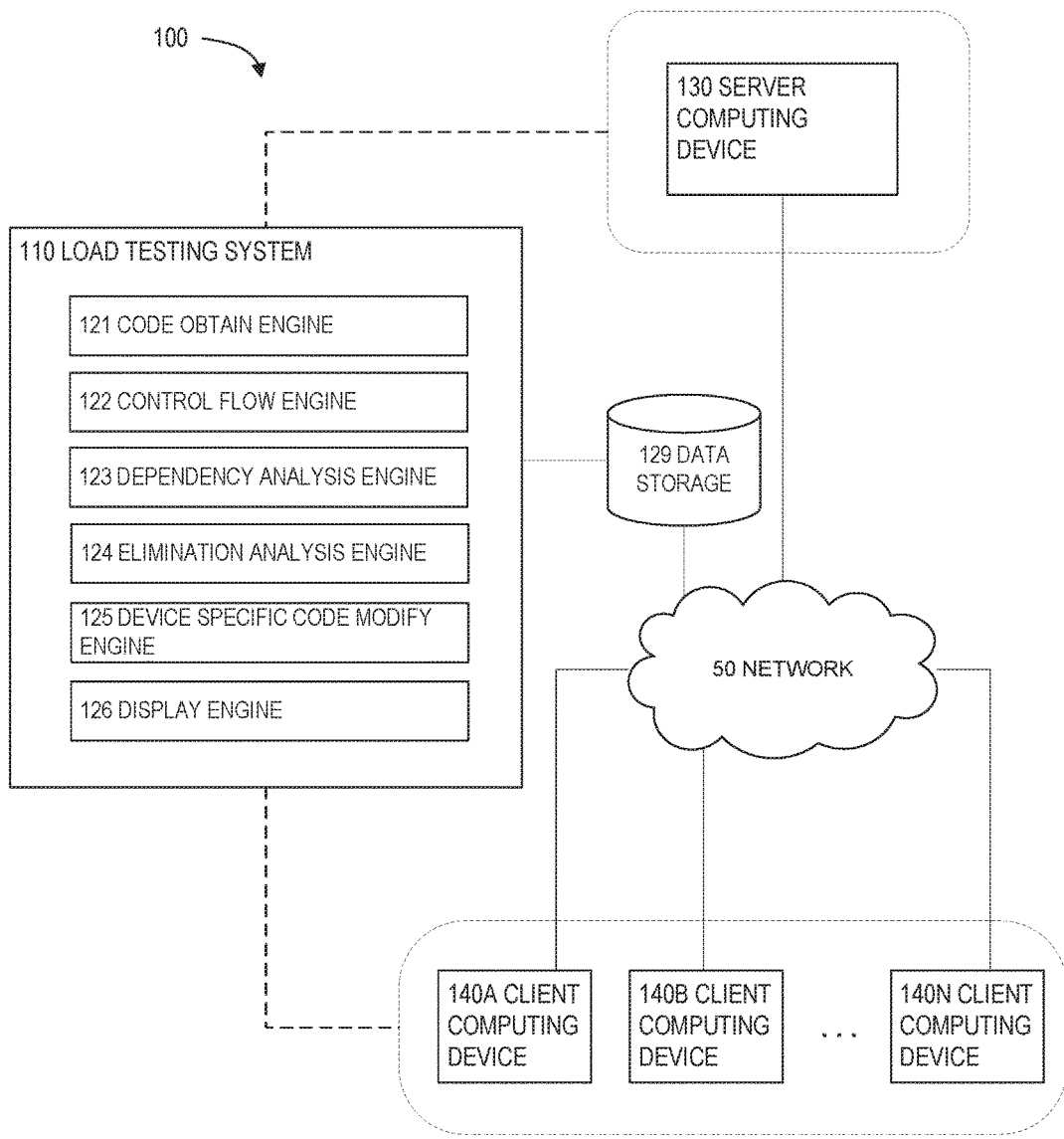
FIG. 1 is a block diagram depicting an example environment in which various examples may be implemented as a load testing system.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

A testing script may include machine-readable instructions and variables, and may be generated based on recording behavior of an application. The script can be replayed to simulate the behavior associated with execution of the application. In some examples, an application can be executed on a server computing device. The application can be a web application or other type of application that is accessible by users (and corresponding client computing devices).

In some implementations, a script may be a transport script, which is used for simulating traffic behavior associated with execution of an application. Traffic associated with execution of the application can include dynamic data, which can refer to data that changes with different executions of the application. To produce the script, traffic associated with the application during execution can be monitored and analyzed to identify the dynamic data. The dynamic data can then be used for generating the script, which can be replayed to perform a target task. Replaying of such a transport script allows for the traffic behavior associated with execution of the application to be simulated, including dynamic data behavior.

Examples of tasks that can be performed based on replaying a script include a testing task, such as load testing, testing of an application programming interface (API), or some other type of testing.

Load testing is the practice of verifying integrity and performance of an application while simulating load conditions such as traffic. To perform load testing of an application such as a web application, a script may be created for simulating traffic behavior associated with execution of the application. To provide a more robust script, traffic associated with multiple execution instances of an application can be monitored and analyzed for the purpose of identifying dynamic data (e.g., correlation data, parameter data, and other types of dynamic data) for use in producing the script. An "execution instance" of an application can refer to an instance of the application as invoked by a requestor. In some cases, a large number (e.g., 100 or more) of execution instances of the application can be monitored. Moreover, instances of multiple applications can be monitored. Based on the monitored traffic associated with execution instances of one or multiple applications, dynamic data associated with each application can be identified, and such identified dynamic data can be used for purposes of producing a script (or multiple scripts), such as transport script(s).

Dynamic data may include "correlation data," which refers to data that is generated by a server computing device (e.g., server computing device 130 of FIG. 1) and communicated to a client computing device (e.g., client computing device 140 of FIG. 1) during interaction between the client computing device and the application in the server computing device. This server-generated data that is provided to the client computing device can be data that is useable by the server computing device to associate a particular communication with a given instance of the application. As an example, correlation data can include a session identifier, for identifying a particular session between the client computing device and the application in the server computing device. In other examples, other identifiers relating to communication flows can be used. As yet further examples, correlation data can include authentication data that is produced by the server computing device and communicated to the client computing device to allow the client computing device to use the authentication data for subsequent communications with the application.

Dynamic data may include "parameter data," which refers to user-entered data at the client computing device (e.g., at a browser of the client computing device). As examples, user-entered data can include search terms entered into a query box of a search engine. For example, the application is a search application that is accessible from the client computing device to search for information. As other examples, user-entered data can include data entered into a form, such as during a registration process or other processes. The user-entered data is communicated from the client computing device to the server computing device.

Parameter data can thus be discovered by identifying data originated at the client computing device, where values of the data change between different execution instances of the same application. In some examples, a dictionary can be built, where the dictionary can include parameters and corresponding different values. The dictionary can be later accessed when building a script.

Because of the massive amount of traffic data gathered for multiple execution instances of the application, it can be technically challenging and time consuming to accurately identify dynamic data in the traffic data.

Examples disclosed herein provide technical solutions to these technical challenges by recording lines of code as an application is executed in a client computing device and analyzing the recorded lines of code to eliminate irrelevant portions of the lines of code, allowing dynamic data in the lines of code to be more easily identifiable. The example disclosed herein enable obtaining lines of code that are recorded as an application is executed in a client computing device, the lines of code being recorded in chronological order of the execution; determining whether a dependency on at least one variable exists in individual lines of the lines of code; in response to determining that the dependency exists, storing the dependency in a data storage; identifying, from the lines of code, a line of code including a network call statement that calls a called variable; and eliminating a first subset of the lines of code based on the called variable and dependencies stored in the data storage, wherein a second subset of the lines of code that remain after the elimination comprises user-entered parameter data.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise.

FIG. 1 is an example environment 100 in which various examples may be implemented as a load testing system 110. Environment 100 may include various components including server computing device 130 and client computing devices 140 (illustrated as 140A, 140B, . . . , 140N). Each client computing device 140A, 140B, . . . , 140N may communicate requests to and/or receive responses from server computing device 130. Server computing device 130 may receive and/or respond to requests from client computing devices 140. Client computing devices 140 may be any type of computing device providing a user interface through which a user can interact with a software application. For example, client computing devices 140 may include a laptop computing device, a desktop computing device, an all-in-one computing device, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by client computing devices 140.

The various components (e.g., components 129, 130, and/or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, load testing system 110 and the various components described herein may be implemented in hardware and/or a combination of hardware and programming that configures hardware. Furthermore, in FIG. 1 and other Figures described herein, different numbers of components or entities than depicted may be used.

Load testing system 110 may comprise a code obtain engine 121, a control flow engine 122, a dependency analysis engine 123, an elimination analysis engine 124, a device specific code modify engine 125, a display engine 126, and/or other engines. The term "engine", as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Code obtain engine 121 may obtain lines of code that are recorded during an execution of an application in client computing device 140. Code obtain engine 121 may monitor and/or record traffic associated with execution instances of the application. For example, the lines of code may be recorded as a web application (e.g., resided in server computing device 130) is executed in a web browser of client computing device 140. As a user interacts with the web application via the web browser, the user actions (e.g., clicking on a graphical user interface (GUI) element, filling out a form, etc.) and/or any function-calls that are made in response to such user actions may be recorded. The lines of code may be recorded for a single execution instance of the application and/or for multiple execution instances of the application. Any recording techniques known in the art may be used to perform the recording as discussed herein. The lines of code may be recorded in chronological order of the execution. The recorded lines of code may be arranged in a different order or otherwise modified.

In some implementations, the recorded lines of code may be normalized into a particular format (e.g., a particular programming language syntax). For example, if the recorded lines of code include a line of code such as "a=b+c+d," the normalization may break it into two separate statements such as "a=b+c" and "a=a+d" depending on the specified programming language syntax. Any normalization techniques known in the art may be used to perform the normalization as discussed herein.

Figure 7:
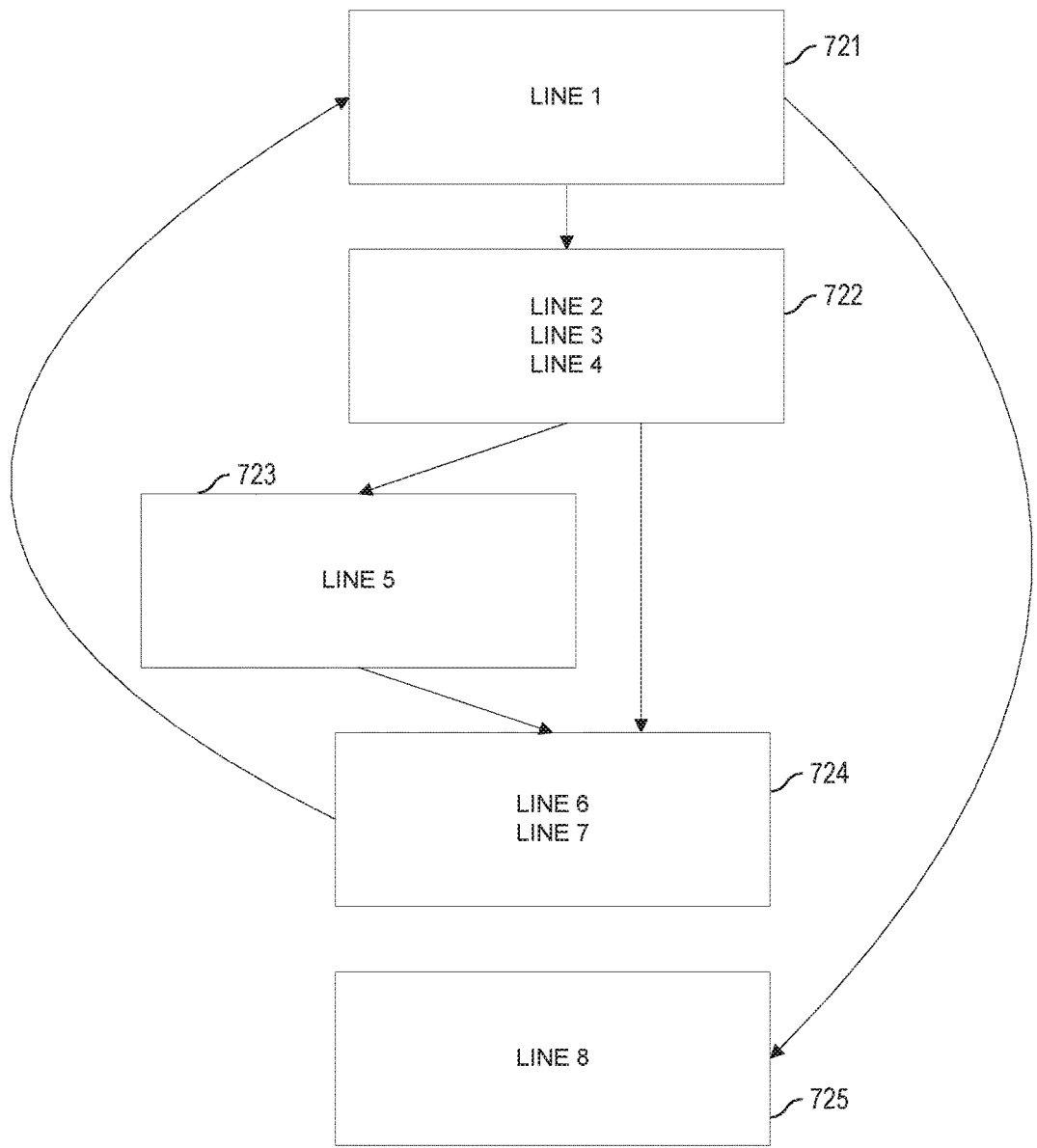
FIG. 7 is a diagram depicting an example control flow graph (CFG).

Control flow engine 122 may determine and/or obtain a control flow graph (CFG) of the lines of code (e.g., obtained by code obtain engine 121). The "CFG," as used herein, may refer to a representation, using graph notation, of all paths that might be traversed through an application during its execution. An example control flow is illustrated in FIG. 7. The CFG may define executable blocks of code and/or relationships among the executable blocks of code. In the CFG, each node in the graph may represent an executable "block," which may refer to a straight-line piece of code without any jump targets (e.g., that start a block) and jumps (e.g., that end a block). Directed edges in the CFG may be used to represent the relationships among the executable blocks of code and/or to represent jumps in the control flow.

In the example illustrated in FIG. 7, blocks 721-725 may represent individual executable blocks of code while the recorded lines of code may comprise Lines 1-8 of FIG. 7. The relationships among the executable blocks of code 721-725 may be represented by the directed edges shown in FIG. 7 (e.g., lines arrows connecting the executable blocks).

In some implementations, control flow engine 122 may determine a subset of the CFG based on a history of user interactions with the application. In other words, the CFG may be modified based on the past user interactions with the application. For example, if a user (or a group of users) have not or have not as frequently (e.g., less than a predetermined threshold frequency value) clicked on a particular GUI element while interacting with the web application via the web browser, the corresponding lines of code, executable blocks of code, and/or directed edges may be removed from the CFG, leaving the subset of the CFG. Using the example illustrated in FIG. 7, suppose executable block 723 represents an "IF" statement that requires the user's clicking of the particular GUI button to execute Line 5 of code. The history (e.g., of a particular time duration) of that user's interactions with the application (and/or multiple users' interactions with the application) may indicate that the GUI button has not been clicked (or not frequently clicked depending on a predefined condition set by control flow engine 122). In this example, control flow engine 122 may modify the CFG by removing executable block 723 (and directed edges connected to executable block 723) from the CFG, leaving executable blocks 721, 722, 724, and 725 and corresponding directed edges that connect those remaining blocks.

The CFG (or the subset of CFG) as determined and/or obtained by control flow engine 122 may be used to perform a dependency analysis and/or an elimination analysis, as discussed herein with respect to dependency analysis engine 123 and elimination analysis engine 124.

Dependency analysis engine 123 may perform a dependency analysis by moving in a first direction of the chronological order to determine whether a dependency on at least one variable exists in each line of the lines of code. The first direction may represent the direction of ascending chronological order of the execution.

Figure 8:
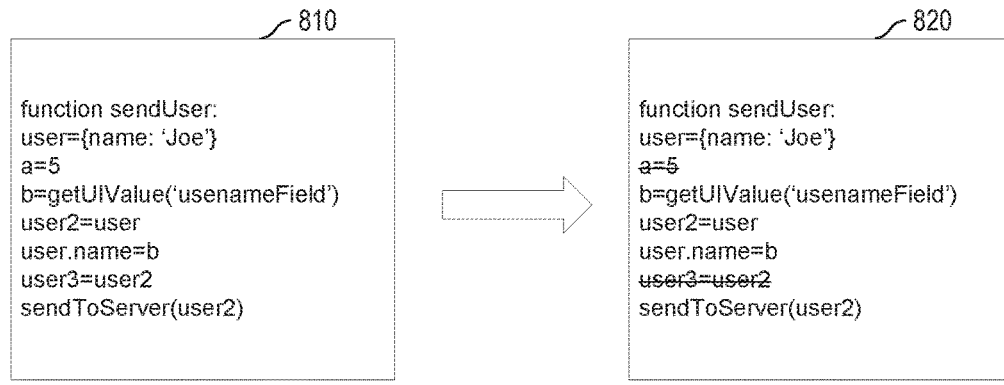
FIG. 8 is a diagram depicting example dependency and elimination analyses performed based on a first CFG.

The example illustrated in FIG. 8 shows a function named "sendUser." Dependency analysis engine 123 may move from the top line of executable block 810 to the bottom line of executable block 810 to determine, for individual lines, whether a dependency on at least one variable exists. In this example, dependency analysis engine 123 may determine that there is no dependency in the initial three lines: "user-={name: 'Joe'}," "a=5," and "b=getUIValue ('usernameField')." For example, these lines merely represent that the variable "user" has the "name" value of 'Joe,' that the variable "a" has the value of 5, and that the variable "b" has a value from an UI field called 'usernameField.' Dependency analysis engine 123 may move to the next line and/or determine that the variable "user2" is dependent on the variable "user." In response to determining that the dependency exists, dependency analysis engine 123 may store the dependency (e.g., that the variable "user2" is dependent on the variable "user") in a data storage (e.g., data storage 129). Similarly, dependency analysis engine 123 may move to the next line and/or determine that the name of variable "user" is dependent on the variable "b." This dependency may be stored in data storage 129. Similarly, dependency analysis engine 123 may move to the next line and/or determine that the variable "user3" is dependent on the variable "user2," which may be stored in data storage 129.

Figure 9:
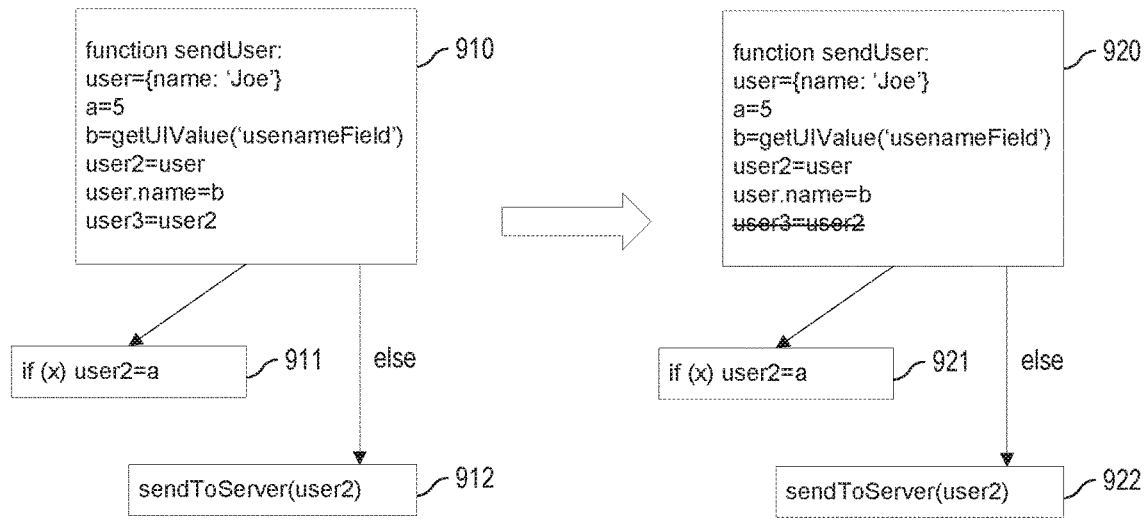
FIG. 9 is a diagram depicting example dependency and elimination analyses performed based on a second CFG.

In some implementations, the dependency analysis may be performed by moving in the first direction of the CFG (or the subset of CFG as discussed herein with respect to control flow engine 122). FIG. 8 illustrates an example dependency analysis performed based on a first CFG where there is a single executable block (e.g., block 810). FIG. 9 illustrates an example dependency analysis performed based on a different (or a second) CFG where there are three executable blocks (e.g., blocks 910-912) including an if-else statement. In some implementations, the dependency analysis may be performed by moving from a first set of lines of code in block 910 to a second set of lines of code in block 911 and/or from the first set of lines of code in block 910 to a third set of lines of code in block 912.

Elimination analysis engine 124 may perform an elimination analysis by moving in a second direction of the chronological order to determine whether to eliminate each line of the lines of code based on dependencies stored in data storage 129. The second direction may represent the direction of descending chronological order the execution.

In some implementations, the elimination analysis may be triggered based on a network call statement in the lines of code. The network call statement may be identified while the dependency analysis is performed by moving in the first direction of the chronological order. When the network call statement is identified, elimination analysis engine 124 may begin to move from the line of code including the identified network call statement in the opposite direction (e.g., the second direction) and perform the elimination analysis.

Using the example illustrated in FIG. 8, the network call statement may be found in the line containing "sendToServer(user2)." Elimination analysis engine 124 may analyze the identified network call statement and/or determine that the variable "user2" is being called by the network call statement. The elimination analysis may be performed by moving from the line of code having "sendToServer(user2)" in the second direction. In doing so, elimination analysis engine 124 may determine, based on the dependencies stored in data storage 129, whether the called variable "user2" is dependent on at least one variable in each line of the lines of code.

Executable block 820 of FIG. 8 illustrates the lines of code after the elimination where the eliminated lines are strike-through. The line "user3=user2" has been eliminated because the called variable "user2" is not dependent on any variables in this line. In other words, this line does not change or affect the called variable "user2." On the other hand, the line "user.name=b" is not eliminated because the called variable "user2" is dependent on the variable "user.name" and the variable "b" based on the dependencies stored in data storage 129. The dependencies indicate, for example, that the called variable "user2" would be changed based on which value the variable "user.name" has and/or which value the variable "b" has (e.g., "user2=user" where "user={name: 'Joe'}" and "user.name=b"). The line "user2=user" is not eliminated because the called variable "user2" is dependent on the variable "user" in this line. The line "b=getUIValue('usernameField') is not eliminated because the called variable "user2" is dependent on the variable "b" (e.g., "user2=user" where "user-={name: 'Joe'}" and "user.name=b"). However, the line "a=5" is eliminated because the called variable "user2" is not dependent on the variable "a" according to the dependencies stored in data storage 129. The line "user={name: 'Joe'}" is not eliminated because the called variable "user2" is dependent on the variable "user" as shown in the dependency associated with the line "user2=user."

In some implementations, the elimination analysis may be performed by moving in the second direction of the CFG (or the subset of the CFG as discussed herein with respect to control flow engine 122). FIG. 8 illustrates an example elimination analysis performed based on a first CFG where there is a single executable block (e.g., block 820). FIG. 9 illustrates an example elimination analysis performed based on a different (or a second) CFG where there are three executable blocks (e.g., blocks 920-921) including an if-else statement. The elimination analysis may be performed by moving from the third set of lines of code in block 922 to the first set of lines of code in block 920 and/or from the second set of lines of code in block 921 to the first set of lines of code in block 920. Note that the line "a=5" that was eliminated in the example of FIG. 8 is not being eliminated in the example of FIG. 9. This is because the dependencies stored in data storage 129 indicate that the called variable "user2" is dependent on the variable "a" if the condition "x" is met (see block 921).

Device specific code modify engine 125 may modify the lines of code that include code statement that are specific to client computing device 140 and/or a browser of client computing device 140. For example, any browser or device specific code statements may be modified and/or removed from the lines of code. In this way, the resulting testing script can run without any browser and/or device dependencies (e.g., without cookies, caching, forms and hyperlinks, etc.), which means that the browser does not need to be launched during the load test.

Through the dependency analysis and the elimination analysis, irrelevant portions of the lines of code can be eliminated, allowing dynamic data (e.g., correlation data, parameter data, etc.) to be more easily identifiable.

Display engine 126 may cause a display of a subset of the lines of code that remain after the elimination analysis. The subset of the lines of code may include the dynamic data. In some implementations, the subset of the lines of code may be parameterized to produce a final testing script. For example, a user-entered parameter can be parameterized such that the parameter is replaced with a predefined list of values. In some instances, a dictionary can be built, where the dictionary can include parameters and corresponding different values. The dictionary may be later accessed to retrieve the predefined list of values for the parameter. Using the examples illustrated in FIGS. 8-9, the user-entered parameter such as "getUIValue('usernameField')" may be replaced with a predefined list of values that include different values for the user name.

In order to help identifying such user-entered parameters in the subset of the lines of code, display engine 126 may present the subset of the lines of code such that the user-entered parameter (e.g., "getUIValue('usernameField')" and/or the line of code that includes the user-entered parameter) is displayed visually different from the rest of the subset of the lines of code. For example, the user-entered parameter data may be highlighted, shown in a different color, shown in a different font, and/or otherwise made more easily identifiable.

In performing their respective functions, engines 121-126 may access data storage 129 and/or other suitable database(s). Data storage 129 may represent any memory accessible to load testing system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Load testing system 110 may access data storage 129 locally or remotely via network 50 or other networks.

Data storage 129 may include a database to organize and store data.

Database 129 may be, include, or interface to, for example, an Oracle™ relational database sold commercially by Oracle Corporation. Other databases, such as Informix™, DB2 (Database 2) or other data storage, including file-based (e.g., comma or tab separated files), or query formats, platforms, or resources such as OLAP (On Line Analytical Processing), SQL (Structured Query Language), a SAN (storage area network), Microsoft Accessm™, MySQL, PostgreSQL, HSpace, Apache Cassandra, MongoDB, Apache CouchDB™, or others may also be used, incorporated, or accessed. The database may reside in a single or multiple physical device(s) and in a single or multiple physical location(s). The database may store a plurality of types of data and/or files and associated data or file description, administrative information, or any other data.

Figure 2:
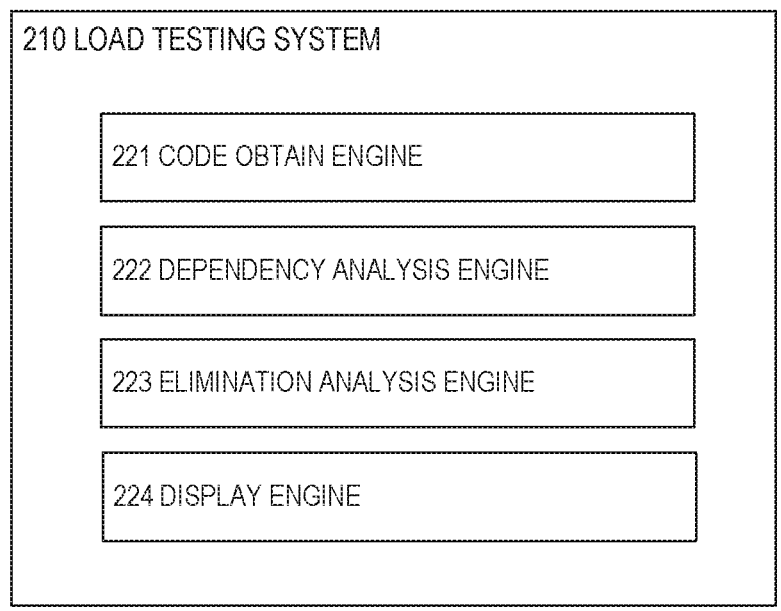
FIG. 2 is a block diagram depicting an example load testing system.

FIG. 2 is a block diagram depicting an example load testing system 210. Load testing system 210 may comprise a code obtain engine 221, a dependency analysis engine 222, an elimination analysis engine 223, a display engine 224, and/or other engines. Engines 221-224 represent engines 121, 123, 124, and 126 respectively.

Figure 3:
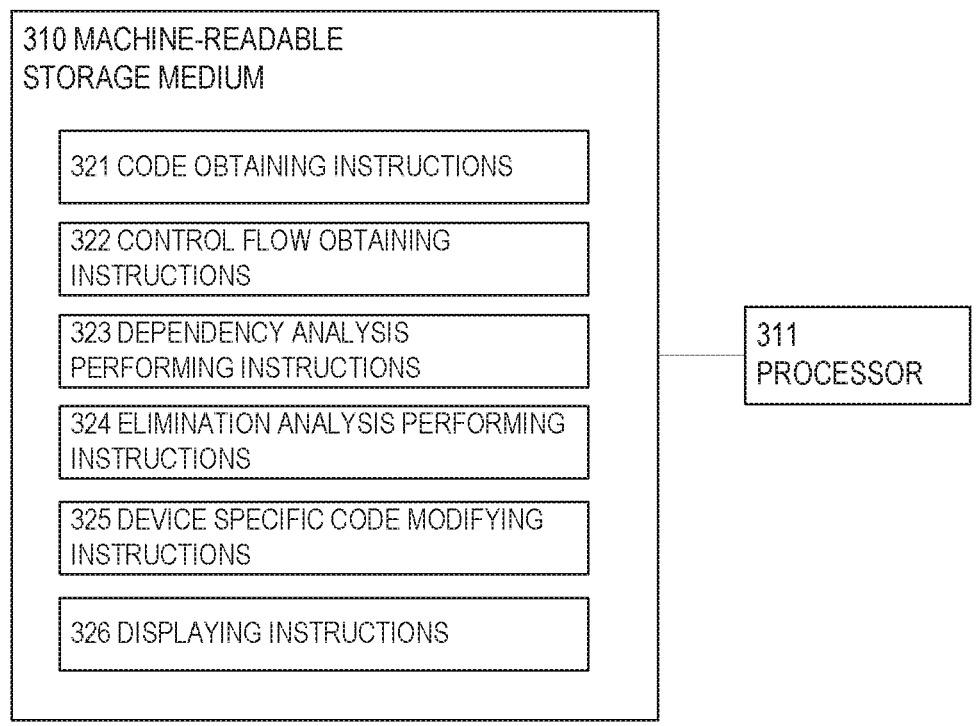
FIG. 3 is a block diagram depicting an example machine-readable storage medium comprising instructions executable by a processor for load testing.

FIG. 3 is a block diagram depicting an example machine-readable storage medium 310 comprising instructions executable by a processor for load testing.

In the foregoing discussion, engines 121-126 were described as combinations of hardware and programming. Engines 121-126 may be implemented in a number of fashions. Referring to FIG. 3, the programming may be processor executable instructions 321-326 stored on a machine-readable storage medium 310 and the hardware may include a processor 311 for executing those instructions. Thus, machine-readable storage medium 310 can be said to store program instructions or code that when executed by processor 311 implements load testing system 110 of FIG. 1.

In FIG. 3, the executable program instructions in machine-readable storage medium 310 are depicted as code obtaining instructions 321, control flow obtaining instructions 322, dependency analysis performing instructions 323, elimination analysis performing instructions 324, device specific code modifying instructions 325, and displaying instructions 326. Instructions 321-326 represent program instructions that, when executed, cause processor 311 to implement engines 121-126, respectively.

Figure 4:
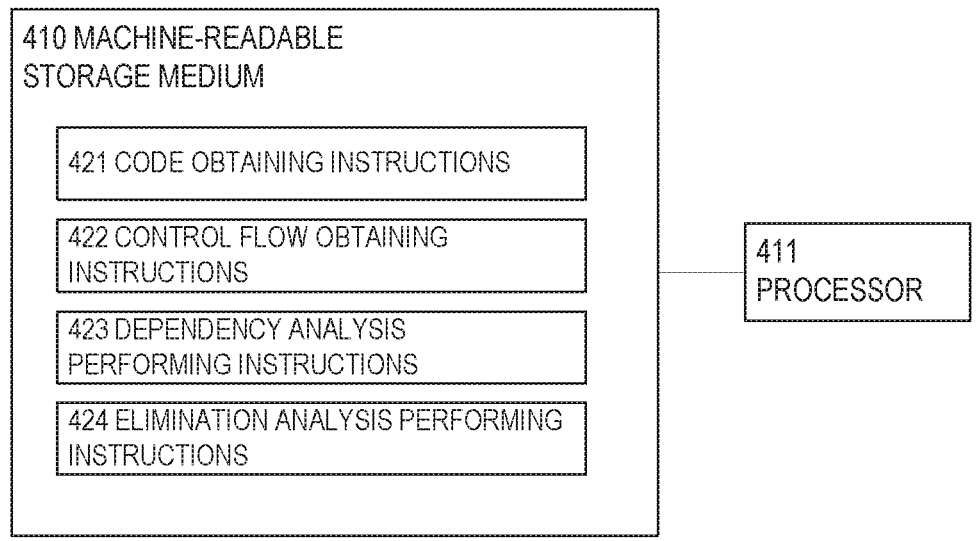
FIG. 4 is a block diagram depicting an example machine-readable storage medium comprising instructions executable by a processor for load testing.

FIG. 4 is a block diagram depicting an example machine-readable storage medium 410 comprising instructions executable by a processor for load testing.

In the foregoing discussion, engines 121-126 were described as combinations of hardware and programming. Engines 121-126 may be implemented in a number of fashions. Referring to FIG. 4, the programming may be processor executable instructions 421-424 stored on a machine-readable storage medium 410 and the hardware may include a processor 411 for executing those instructions. Thus, machine-readable storage medium 410 can be said to store program instructions or code that when executed by processor 411 implements load testing system 110 of FIG. 1.

In FIG. 4, the executable program instructions in machine-readable storage medium 410 are depicted as code obtaining instructions 421, control flow obtaining instructions 422, dependency analysis performing instructions 423, and elimination analysis performing instructions 424. Instructions 421-424 represent program instructions that, when executed, cause processor 411 to implement engines 121-124, respectively.

Machine-readable storage medium 310 (or machine-readable storage medium 410) may be any electronic, magnetic, optical, or other physical storage device that contains or stores executable instructions. In some implementations, machine-readable storage medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program instructions may be part of an installation package that when installed can be executed by processor 311 (or processor 411) to implement load testing system 110. In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-326, and/or other instructions. As an alternative or in addition to retrieving and executing instructions, processor 311 may include at least one electronic circuit comprising a number of electronic components for performing the functionality of at least one of instructions 321-326, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 421-424, and/or other instructions. As an alternative or in addition to retrieving and executing instructions, processor 411 may include at least one electronic circuit comprising a number of electronic components for performing the functionality of at least one of instructions 421424, and/or other instructions.

Figure 5:
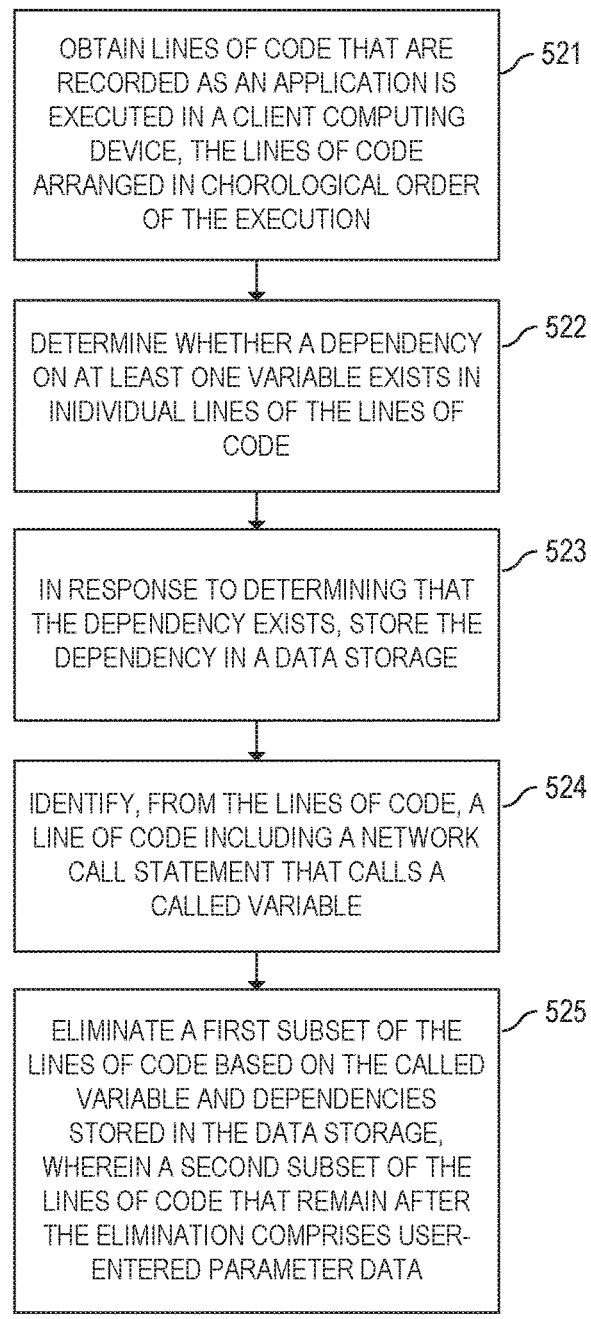
FIG. 5 is a flow diagram depicting an example method for load testing.

FIG. 5 is a flow diagram depicting an example method 500 for load testing. The various processing blocks and/or data flows depicted in FIG. 5 (and in the other drawing figures such as FIG. 6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant be an example and, as such, should not be viewed as limiting. Method 500 may be implemented in the form of executable instructions stored on a machine-readable storage medium, such as storage medium 310, and/or in the form of electronic circuitry.

Method 500 may start in block 521 where method 500 may obtain lines of code that are recorded as an application is executed in a client computing device (e.g., client computing device 140). Method 500 may monitor and/or record traffic associated with execution instances of the application. For example, the lines of code may be recorded as a web application (e.g., resided in server computing device 130) is executed in a web browser of client computing device 140. As a user interacts with the web application via the web browser, the user actions (e.g., clicking on a graphical user interface (GUI) element, filling out a form, etc.) and/or any function-calls that are made in response to such user actions may be recorded. The lines of code may be recorded in chronological order of the execution. The recorded lines of code may be arranged in a different order or otherwise modified.

In block 522, method 500 may determine whether a dependency on at least one variable exists in individual lines of the lines of code. For example, method 500 may perform a dependency analysis by moving in the direction of ascending chronological order of the execution to determine whether to eliminate the individual lines of the lines of code based on a result of the dependency analysis. In response to determining that the dependency exists, method 500, in block 523, may store the dependency in a data storage (e.g., data storage 129 of FIG. 1). The example illustrated in FIG. 8 shows a function named "sendUser." Method 500 may move from the top line of executable block 810 to the bottom line of executable block 810 to determine, for individual lines, whether a dependency on at least one variable exists. In this example, method 500 may determine that there is no dependency in the initial three lines: "user={name: 'Joe'}," "a=5," and "b=getUIValue ('usernameField')." For example, these lines merely represent that the variable "user" has the "name" value of 'Joe,' that the variable "a" has the value of 5, and that the variable "b" has a value from an UI field called 'usernameField.' Method 500 may move to the next line and/or determine that the variable "user2" is dependent on the variable "user." In response to determining that the dependency exists, method 500 may store the dependency (e.g., that the variable "user2" is dependent on the variable "user") in the data storage. Similarly, method 500 may move to the next line and/or determine that the name of variable "user" is dependent on the variable "b." This dependency may be stored in the data storage. Similarly, method 500 may move to the next line and/or determine that the variable "user3" is dependent on the variable "user2," which may be stored in the data storage.

In block 524, method 500 may identify, from the lines of code, a line of code including a network call statement that calls a called variable. In some implementations, the network call statement may be identified while the dependency analysis of block 522 is performed. Using the example illustrated in FIG. 8, the network call statement may be found in the line containing "sendToServer(user2)." Method 500 may analyze the identified network call statement and/or determine that the variable "user2" is being called by the network call statement. When the network call statement is identified, method 500 may proceed to block 525.

In block 525, method 500 may eliminate a first subset of the lines of code based on the called variable and dependencies stored in the data storage. For example, method 500 may perform an elimination analysis by moving from the line of code including the network call statement in the direction of descending chronological order of the execution to determine whether to eliminate the individual lines of the lines of code based on a result of the dependency analysis (e.g., dependencies stored in data storage 129). Using the example illustrated in FIG. 9, the elimination analysis may be performed by moving from the line of code having "sendToServer(user2)" in the direction of descending chronological order of the execution. In doing so, method 500 may determine, based on the dependencies stored in data storage 129, whether the called variable "user2" is dependent on at least one variable in each line of the lines of code.

Through the dependency analysis and the elimination analysis, irrelevant portions of the lines of code can be eliminated, allowing dynamic data (e.g., correlation data, parameter data, etc.) to be more easily identifiable. A second subset of the lines of code that remain after the elimination may comprise user-entered parameter data. In some implementations, the second subset of the lines of code may be parameterized to produce a final testing script. For example, a user-entered parameter can be parameterized such that the parameter is replaced with a predefined list of values. In some instances, a dictionary can be built, where the dictionary can include parameters and corresponding different values. The dictionary may be later accessed to retrieve the predefined list of values for the parameter. Using the examples illustrated in FIGS. 8-9, the user-entered parameter such as "getUIValue('usernameField')" may be replaced with a predefined list of values that include different values for the user name.

Referring back to FIG. 1, code obtain engine 121 may be responsible for implementing block 521. Dependency analysis engine 123 may be responsible for implementing blocks 522-524. Elimination analysis engine 124 may be responsible for implementing block 525.

Figure 6:
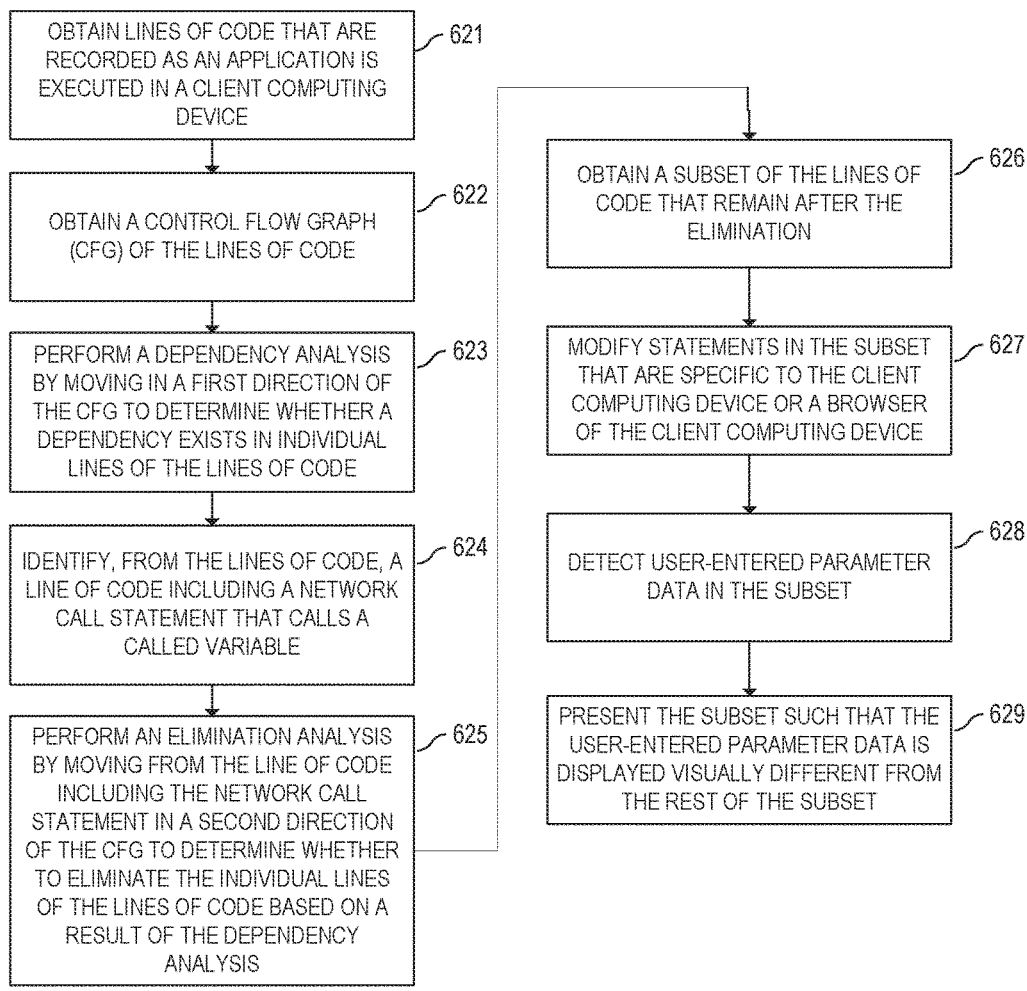
FIG. 6 is a flow diagram depicting an example method for load testing.

FIG. 6 is a flow diagram depicting an example method 600 for load testing. Method 600 as illustrated (and described in greater detail below) is meant be an example and, as such, should not be viewed as limiting. Method 600 may be implemented in the form of executable instructions stored on a machine-readable storage medium, such as storage medium 210, and/or in the form of electronic circuitry.

Method 600 may start in block 621 where method 600 may obtain lines of code that are recorded as an application is executed in a client computing device (e.g., client computing device 140). Method 600 may monitor and/or record traffic associated with execution instances of the application. For example, the lines of code may be recorded as a web application (e.g., resided in server computing device 130) is executed in a web browser of client computing device 140. As a user interacts with the web application via the web browser, the user actions (e.g., clicking on a graphical user interface (GUI) element, filling out a form, etc.) and/or any function-calls that are made in response to such user actions may be recorded. The lines of code may be recorded in chronological order of the execution. The recorded lines of code may be arranged in a different order or otherwise modified.

In block 622, method 600 may obtain a control flow graph (CFG) of the lines of code (e.g., obtained in block 621). The CFG may define executable blocks of code and/or relationships among the executable blocks of code. In the example CFG illustrated in FIG. 7, blocks 721-725 may represent individual executable blocks of code while the recorded lines of code may comprise Lines 1-8 of FIG. 7. The relationships among the executable blocks of code 721-725 may be represented by the directed edges shown in FIG. 7 (e.g., lines arrows connecting the executable blocks).

In some implementations, the CFG may be modified based on a history of user interactions with the application. For example, if a user (or a group of users) have not or have not as frequently (e.g., less than a predetermined threshold frequency value) clicked on a particular GUI element while interacting with the web application via the web browser, the corresponding lines of code, executable blocks of code, and/or directed edges may be removed from the CFG. Using the example illustrated in FIG. 7, suppose executable block 723 represents an "IF" statement that requires the user's clicking of the particular GUI button to execute Line 5 of code. The history (e.g., of a particular time duration) of that user's interactions with the application (and/or multiple users' interactions with the application) may indicate that the GUI button has not been clicked (or not frequently clicked depending on a predefined condition set by control flow engine 122). In this example, the CFG may be modified by removing executable block 723 (and directed edges connected to executable block 723) from the CFG, leaving executable blocks 721, 722, 724, and 725 and corresponding directed edges that connect those remaining blocks.

In block 623, method 600 may perform a dependency analysis by moving in a first direction of the CFG (or the modified CFG) to determine whether a dependency on at least one variable exists in individual lines of the lines of code. The first direction may represent the direction of ascending chronological order of the execution. FIG. 8 illustrates an example dependency analysis performed based on a first CFG where there is a single executable block (e.g., block 810). In FIG. 8, method 600 may move from the top line of executable block 810 to the bottom line of executable block 810 to determine, for the individual lines, whether a dependency on at least one variable exists. FIG. 9 illustrates an example dependency analysis performed based on a different (or a second) CFG where there are three executable blocks (e.g., blocks 910-912) including an if-else statement. In some implementations, the dependency analysis may be performed by moving from a first set of lines of code in block 910 to a second set of lines of code in block 911 and/or from the first set of lines of code in block 910 to a third set of lines of code in block 912.

In block 624, method 600 may identify, from the lines of code, a line of code including a network call statement that calls a called variable. In some implementations, the network call statement may be identified while the dependency analysis is performed by moving in the first direction of the CFG (or the modified CFG). Using the example illustrated in FIG. 8, the network call statement may be found in the line containing "sendToServer(user2)." Method 600 may analyze the identified network call statement and/or determine that the variable "user2" is being called by the network call statement. When the network call statement is identified, method 600 may begin to move from the line of code including the identified network call statement in the opposite direction (e.g., a second direction) of the CFG (or the modified CFG) and perform the elimination analysis. The second direction may represent the direction of descending chronological order the execution.

In block 625, method 600 may perform an elimination analysis by moving from the line of code including the network call statement in the second direction of the CFG (or the modified CFG) to determine whether to eliminate each line of the lines of code based on a result of the dependency analysis (e.g., dependencies stored in data storage 129). Using the example illustrated in FIG. 9, the elimination analysis may be performed by moving from the third set of lines of code in block 922 to the first set of lines of code in block 920 and/or from the second set of lines of code in block 921 to the first set of lines of code in block 920. In this example, the elimination analysis may be performed by moving from the line of code having "sendToServer(user2)" in the second direction. In doing so, method 600 may determine, based on the dependencies stored in data storage 129, whether the called variable "user2" is dependent on at least one variable in each line of the lines of code.

In block 626, method 600 may obtain a subset of the lines of code that remain after the elimination. Through the dependency analysis and the elimination analysis, irrelevant portions of the lines of code can be eliminated, allowing dynamic data (e.g., correlation data, parameter data, etc.) to be more easily identifiable.

In block 627, method 600 may modify the lines of code that include code statement that are specific to client computing device 140 and/or a browser of client computing device 140. For example, any browser or device specific code statements may be modified and/or removed from the lines of code. In this way, the resulting testing script can run without any browser and/or device dependencies (e.g., without cookies, caching, forms and hyperlinks, etc.), which means that the browser does not need to be launched during the load test.

The subset of the lines of code may include the dynamic data. In some implementations, the subset of the lines of code may be parameterized to produce a final testing script. For example, a user-entered parameter can be parameterized such that the parameter is replaced with a predefined list of values. In some instances, a dictionary can be built, where the dictionary can include parameters and corresponding different values. The dictionary may be later accessed to retrieve the predefined list of values for the parameter. Using the examples illustrated in FIGS. 8-9, the user-entered parameter such as "getUIValue('usernameField')" may be replaced with a predefined list of values that include different values for the user name.

In order to help identifying such user-entered parameters in the subset of the lines of code, method 600 may detect user-entered parameter data in the subset of the lines of code that remain after the elimination (block 628) and present the subset of the lines of code such that the user-entered parameter (e.g., "getUIValue('usernameField')" and/or the line of code that includes the user-entered parameter) is displayed visually different from the rest of the subset of the lines of code (block 629). For example, the user-entered parameter data may be highlighted, shown in a different color, shown in a different font, and/or otherwise made more easily identifiable.

Referring back to FIG. 1, code obtain engine 121 may be responsible for implementing block 621. Control flow engine 122 may be responsible for implementing block 622. Dependency analysis engine 123 may be responsible for implementing blocks 623-624. Elimination analysis engine 124 may be responsible for implementing blocks 625-626. Device specific code modify engine 125 may be responsible for implementing block 627. Display engine 126 may be responsible for implementing blocks 628-629.

FIGS. 7-9 are discussed herein with respect to FIGS. 1-6.

The foregoing disclosure describes a number of example implementations for load testing. The disclosed examples may include systems, devices, computer-readable storage media, and methods for load testing. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method performed by a processor of a computing device, the method comprising:
obtaining recorded lines of code of an application that are recorded as the application is executed in a client computing device;
performing a dependency analysis, including examining the recorded lines of code in a chronological order to determine variables in the recorded lines of code that are dependent on other variables in the recorded lines of code;
storing dependencies between the variables in a data storage; and
performing an elimination analysis, including:
in response to identifying, from the recorded lines of code, a first line of code including a network call statement that calls a called variable, examining the recorded lines of code in a reversed chronological order to identify a second line of code that contains the called variable and another variable,
based on the dependencies between the variables stored in the data storage, determining whether the called variable called by the network call statement is dependent on the other variable appearing in the second line of code, and in response to a determination that the called variable called by the network call statement is not dependent on the other variable appearing in the second line of code, eliminating the second line of code from the recorded lines of code.

2. The method of claim 1, further comprising:
in response to a determination that the called variable called by the network call statement is dependent on the other variable appearing in the second line of code, maintaining the second line of code in the recorded lines of code.

3. The method of claim 1, further comprising:
obtaining a control flow graph (CFG) of the recorded lines of code, the CFG defining executable blocks of code and relationships among the executable blocks of code; and
determining a subset of the CFG based on a history of user interactions with the application, wherein the dependency analysis and the elimination analysis are performed in accordance with the subset of the CFG.

4. The method of claim 1, wherein examining the recorded lines of code in the reversed chronological order to identify the second line of code comprises:
examining the recorded lines of code in the reversed chronological order starting from the first line of code until the second line of code that contains the called variable and the other variable is identified.

5. The method of claim 1, further comprising:
presenting a subset of the recorded lines of code that remain after the elimination of the second line of code, wherein the subset of the recorded lines of code includes user-entered parameter data such that the user-entered parameter data is displayed visually different from the rest of the subset of the recorded lines of code.

6. The method of claim 1, further comprising:
normalizing the recorded lines of code based on a programming language syntax.

7. The method of claim 1, further comprising:
modifying the recorded lines of code that include statements that are specific to the client computing device or a browser of the client computing device.

8. A non-transitory machine-readable storage medium comprising instructions executable by a processor of a computing device to cause the processor to:
obtain recorded lines of code of an application that are recorded during an execution of the application in a client computing device;
perform a dependency analysis by examining the recorded lines of code in a chronological order to determine variables in the recorded lines of code that are dependent on other variables in the recorded lines of code; and
perform an elimination analysis by identifying, from the recorded lines of code, a first line of code including a network call statement that calls a called variable, examining the recorded lines of code in a reversed chronological order to identify a second line of code that contains the called variable and another variable, determining whether the called variable called by the network call statement is dependent on the other variable appearing in the second line of code, and eliminating the second line of code based on a determination that the called variable called by the network call statement is not dependent on the other variable appearing in the second line of code.

9. The non-transitory machine-readable storage medium of claim 8, wherein the instructions are executable to cause the processor to:
obtain a control flow graph (CFG) of the recorded lines of code;
monitor user interactions with the application; and
calculate the CFG based on the monitored user interactions.

10. The non-transitory machine-readable storage medium of claim 8, wherein, to examine the recorded lines of code in the reversed chronological order to determine the second line of code, the instructions are executable to cause the processor to:
examine the recorded lines of code in the reversed chronological order starting from the first line of code until the second line of code that contains the called variable and the other variable is identified.

11. The non-transitory machine-readable storage medium of claim 8, wherein the instructions are executable to cause the processor to:
in response to a determination that the called variable called by the network call statement is dependent on the other variable appearing in the second line of code, maintain the second line of code in the recorded line of code.

12. The non-transitory machine-readable storage medium of claim 8, wherein the instructions are executable to cause the processor to:
modify the recorded lines of code that include statements that are specific to the client computing device or a browser of the client computing device.

13. A system comprising:
a processor; and
a memory storing instructions executable to cause the processor to:
obtain recorded lines of code of an application that are recorded during an execution of the application in a client computing device;
perform a dependency analysis, including instructions that cause the processor to examine the recorded lines of code in a chronological order to determine variables in the recorded lines of code that are dependent on other variables in the recorded lines of code;
store dependencies between the variables in a data storage;
perform an elimination analysis, including instructions that cause the processor to:
in response to identifying, from the recorded lines of code, a first line of code including a network call statement that calls a called variable, examine the recorded lines of code in a reversed chronological order to identify a second line of code that contains the called variable and another variable,
based on the dependencies between the variables stored in the data storage, determine whether the called variable called by the network call statement is dependent on the other variable appearing in the second line of code, and
in response to a determination that the called variable called by the network call statement is not dependent on the other variable appearing in the second line of code, eliminate the second line of code from the recorded lines of code; and
cause a display of a subset of the recorded lines of code that remain after the elimination of the second line of code, wherein the subset of the recorded lines of code is used for load testing.

14. The system of claim 13, wherein the instructions that cause the processor to cause the display of the subset of the recorded lines of code comprise instructions that cause the processor to:

detect user-entered parameter data in the subset of the recorded lines of code; and highlight portions of the subset of the recorded lines of code that indicate the detected user-entered parameter data.

15. The system of claim 13, wherein the instructions are executable to cause the processor to:

determine a control flow graph (CFG) of the recorded lines of code, the CFG comprising a first executable block of code that is connected to a second executable block of code, wherein the dependency analysis and the elimination analysis are performed based on the CFG of the recorded lines of code.

16. The system of claim 13, wherein the instructions are executable to cause the processor to:

in response to a determination that the called variable called by the network call statement is dependent on the other variable appearing in the second line of code, maintain the second line of code in the recorded line of code.

17. The system of claim 13, wherein, to examine the recorded lines of code in the reversed chronological order to determine the second line of code, the instructions are executable to cause the processor to:

examine the recorded lines of code in the reversed chronological order starting from the first line of code until the second line of code that contains the called variable and the other variable is identified.

18. The system of claim 13, wherein the instructions are executable to cause the processor to:

modify the recorded lines of code that include statements that are specific to the client computing device or a browser of the client computing device.

19. The system of claim 13, wherein the subset of the recorded lines of code includes user-entered parameter data such that the user-entered parameter data is displayed visually different from the rest of the subset of the recorded lines of code.

20. The system of claim 13, wherein the instructions are executable to cause the processor to:

normalize the recorded lines of code based on a programming language syntax.

\* \* \* \* \*